United States Patent
Moeller et al.

(10) Patent No.: US 9,641,463 B2
(45) Date of Patent: May 2, 2017

(54) RELATING BUFFER MANAGEMENT

(75) Inventors: Dirk Moeller, Munich (DE); Vladimir Litovtchenko, Munich (DE)

(73) Assignee: NXP USA, Inc., Austin, TX (US)

( * ) Notice: Subject to any disclaimer, the term of this patent is extended or adjusted under 35 U.S.C. 154(b) by 1732 days.

(21) Appl. No.: 12/305,107

(22) PCT Filed: Jul. 5, 2006

(86) PCT No.: PCT/EP2006/063897
§ 371 (c)(1),
(2), (4) Date: Dec. 16, 2008

(87) PCT Pub. No.: WO2008/003353
PCT Pub. Date: Jan. 10, 2008

(65) Prior Publication Data
US 2010/0002658 A1    Jan. 7, 2010

(51) Int. Cl.
*H04L 12/861* (2013.01)
*H04L 12/40* (2006.01)
*H04L 29/08* (2006.01)
*G06F 11/07* (2006.01)

(52) U.S. Cl.
CPC ......... *H04L 49/90* (2013.01); *G06F 11/0739* (2013.01); *H04L 67/12* (2013.01); *H04L 2012/40241* (2013.01); *H04L 2012/40273* (2013.01)

(58) Field of Classification Search
None
See application file for complete search history.

(56) References Cited

U.S. PATENT DOCUMENTS

| | | | | |
|---|---|---|---|---|
| 5,954,813 | A | * | 9/1999 | Mann .................. G06F 11/3656 710/14 |
| 2004/0081079 | A1 | * | 4/2004 | Forest et al. .................. 370/216 |
| 2004/0090962 | A1 | * | 5/2004 | Forest .................. H04L 12/417 370/392 |
| 2006/0285555 | A1 | * | 12/2006 | Kato ...................... H04L 69/12 370/476 |
| 2009/0119425 | A1 | * | 5/2009 | Litovtchenko ............ G06F 5/12 710/55 |

(Continued)

FOREIGN PATENT DOCUMENTS

EP    1355458 B1    9/2005

OTHER PUBLICATIONS

PCT/EP2006/063897 International Search Report and Written Opinion mailed May 2, 2007.

(Continued)

*Primary Examiner* — Andrew Oh

(57) ABSTRACT

A receive buffer of the type that receives information at regular time slots and is required to indicate any status changes to a micro control unit (MCU), the receive buffer including: a slot status field for storing slot status information at each timeslot for the receive buffer; a receive interrupt flag for sending a signal to the MCU for indicating a change of the slot status field on receipt of the information at each timeslot; characterized in that the receive buffer also includes: an empty slot recognition bit for determining if an empty slot is received and generating an indicator thereof, wherein the indicator is passed to the MCU instead of the useless empty slot status field.

20 Claims, 3 Drawing Sheets

(56) References Cited

U.S. PATENT DOCUMENTS

2009/0125592 A1* 5/2009 Hartwich ................ H04L 49/90
709/206
2009/0282179 A1* 11/2009 Patzelt .................. G06F 9/4812
710/262
2009/0327545 A1* 12/2009 Litovtchenko ...... H04L 12/2602
710/105

OTHER PUBLICATIONS

Hartwich et al., "Message Handling Concept for a FlexRay Communication Controller," Hanser Automotive 2004 Special Edition, <<http://www.hanser-automotive.de/fileadmin/heftarchiv/2004/flex32-35.pdf>>, Dec. 31, 2004, 4 pages.
MFR4200 Data Sheet, Dec. 2006, Rev. 1, Freescale Semiconductor, Inc., <<http://cache.freescale.com/files/peripherals_coprocessors/doc/data_sheet/MFR4200.pdf>>, 260 pages.

* cited by examiner

RELATING BUFFER MANAGEMENT

FIELD OF THE INVENTION

This invention relates to improvement in or relating to buffer management, particularly but not exclusively to the environment of Time Division Multiple Access (TDMA) systems.

BACKGROUND OF THE INVENTION

TDMA is a technology for shared medium systems. It allows several elements to share the same bandwidth by dividing it into different timeslots. The elements transmit or receive data in rapid succession, one after the other, each using their own timeslot. This allows multiple elements to share the same transmission medium.

In the environment of automotive design this type of system is now being increasingly adopted to provide an electronic protocol for all control systems and circuitry within an automobile. FlexRay is an automotive communication protocol. The protocol provides flexibility and determinism by combining scalable static and dynamic message transmission, incorporating the advantages of familiar synchronous and asynchronous protocols. The protocol also supports fault-tolerant clock synchronization via a global time base; collision-free bus access; guaranteed message latency; message oriented addressing via identifiers; scalable system fault-tolerance via the support of either single or dual channels.

FlexRay is a protocol adapted for high data rates which supports the needs of future in-car control applications.

FlexRay can operate in single- or dual-channel mode and can provide redundancy if this is required. FlexRay allows both synchronous and asynchronous data transmissions and a clock synchronization mechanism which is fault tolerant. As the clock synchronization is a distributed mechanism if one node fails or for some reason is taken off the network, the other nodes will continue to operate synchronously.

FIG. 1 shows a high level block diagram of a typical FlexRay system as used in a car. A FlexRay backbone 100 is connected to a plurality of gateways (GW1, GW2, GW3, GW4, GWn) each of which provides and receives control signals for different systems or elements in the car. This backbone may be formed in different forms, e.g. as a bus, a star or combination thereof. A non restrictive list of elements or nodes which might be controlled using FlexRay, include: engine, transmission, video, phone, radio, infotainment, locks, climate control, seat control, sunroof, steer-by-wire, brake-by-wire, or any other type of functions.

Each node comprises a communication controller (CC), connected to the Flexray network, and a Micro controller unit (MCU), which controls the CC operations and writes/reads data to/from the CC. Each node has allocated reception and/or transmission time slots in which it must transmit or receive in accordance with know TDMA practices. In a static TDMA environment the slot is not usually empty or the clock synchronisation may be adversely impacted. FlexRay can run a so call dynamic TDMA. In the dynamic TDMA environment the time slots are changeable with each slot having a minimum time allocated to it which can be increased if necessary. If one node takes significantly longer than the allocated slot the time slot of the next node may be used up and that node may have to wait until the next communication cycle to transmit or receive. As a result some and often most of the dynamic segment slots may be empty.

Referring to FIG. 2 each receive buffer includes a set of bits (slot status field (SSF)) which explain the buffer status after any particular reception in a time slot. These indicate: (a) whether or not a valid frame has been received; (b) identification of errors in the data received and (c) absence or not of a signal on the Flexray network and other indicators according to Flexray protocol. The CC generates the SSF and stores it in the node receive buffers after each reception assigned to that node slot/s. When the status is updated it can be signalled to the host MCU by setting an interrupt flag and generating an interrupt signal if enabled. This occurs regardless of whether the slot was empty or not. The interrupt flag is referred to as the RIF.

EP1355458 B1 discloses a Method for transmitting data within a communication system. This patent describes a TDMA scheme for slot based data transmission but does not solve the problem of receipt of empty slots. The patent discloses updating the slot status in any circumstance and there is no teaching of changing the approach to interrupt control mechanisms.

The overwriting of the slot status field SSF by all-zero empty slot status data and generation of non-required interrupts as described above are not condusive to many customer applications. Accordingly a need exists to provide a solution to at least some of the problems identified in the prior art.

SUMMARY OF THE INVENTION

The present invention provides a method and apparatus of buffer management as described in the accompanying claims.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
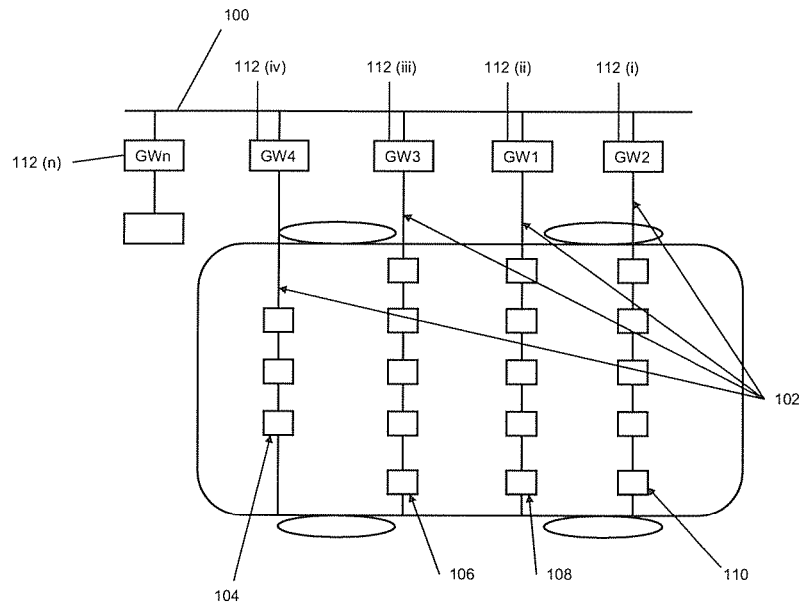
FIG. 1 is a block diagram of a FlexRay backbone applied to an automobile, in accordance with the prior art.
Figure 2:
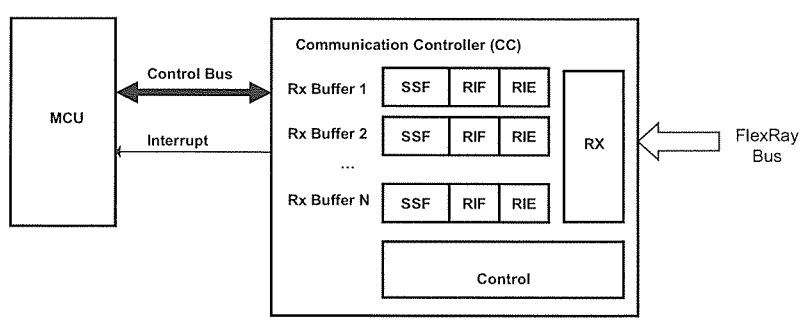
FIG. 2 is a block diagram of a FlexRay node which includes a receive buffer or plurality of receive buffers and associated control logic, in accordance with the prior art.

Referring again to FIG. 1 an overview of a typical FlexRay system is shown. The system includes FlexRay buses 102 which connect a number of nodes shown generally as 104, 106, 108 and 110. The FlexRay backbone provides access to that number of nodes through gateways 112 (i) to (n). Each node comprises a Communication controller (CC) and a Micro control unit (MCU).

Figure 3:
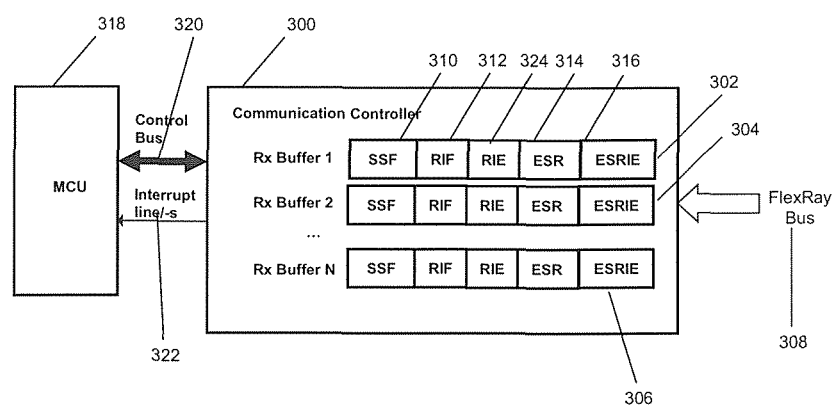
FIG. 3 is a block diagram of a FlexRay node which includes a receive buffer or plurality of receive buffers and associated control logic, in accordance with one embodiment of the invention, given by way of example.

Referring now to FIG. 3 the node 300 is shown in more detail. The CC in this node includes N receive buffers 302, 304, 306 and is connected to a FlexRay bus 308. Referring to receive buffer one 302 further details of the buffer and function will now be provided. The other buffers will be similar thereto.

Receive buffer one 302 includes a number of functional blocks, these are a slot status field (SSF) 310, a receive interrupt flag bit (RIF) 312, a receive interrupt enable bit (RIE) 324, an empty slot reception status bit (ESR) 314 and an empty slot reception interrupt enable bit (ESRIE) 316. The RIE is a control bit which is controlled by the MCU and can be set thereby. The SSF contains information on frame reception status in the slot to which this buffer is assigned. For example status may be: no data/frame received; data/frame received with errors; or data/frame received without errors. The Flexray protocol requires buffer status update after every scheduled reception at a node slots even if a slot is empty or a received frame is corrupted. When the SSF changes, the CC sets the RIF flag and sends an interrupt to the MCU 318 if its interrupt enable bit (RIE) is set to "enable". The CC is connected to the MCU by means of a control bus 320. The requirement for the buffer status update after scheduled reception at a node slots is dictated by the FlexRay protocol, but may also be required for other protocols and processed within other buffer management environments. If a SSF field of the buffer is updated by the CC, then the CC sets the RIF bit to 1 (set) and if the RIE bit is 1 (set) the CC produces an interrupt by means of an interrupt line 322 from the CC, which line is connected to the MCU. As previously set out, the receipt of an empty slot has a number of disadvantages and thus an embodiment of the present invention adds the ESR and ESRIE to the buffer.

The ESR provides an additional status bit. When no signal is received during a slot i.e. there is an empty time slot for the buffer, the ESR is set high (1) and the slot status (SSF) is not updated. The ESRIE is a control bit which is controlled by the MCU and can be set thereby. If the ESR, ESRIE and the RIE are set to high (1) then the RIF is also set to high (1) and an interrupt signal is generated and sent to the MCU by means of the interrupt line (322). This ensures that the MCU is informed of an empty slot. If ESRIE is set low (0) RIF also remains low (0) and thus no interrupt signal is generated to the MCU by means of the interrupt line (322).

By adopting these two extra elements (ESR and ESRIE) in the buffer the previous slot status information is preserved and made available to the host or MCU even after reception (and indication thereof) of an empty slot. The handling of receive buffer slot status update operations is different for non-empty slots from those for empty slots. This means that the CC provides MCU with all the status information it needs both to operate and to comply with the protocol and thereby can provide the required configuration control for the two cases (in case of data reception and in case of an empty slot reception) and protects the host from interrupt overload caused by reception of empty slots at the receive buffers.

Figure 4:
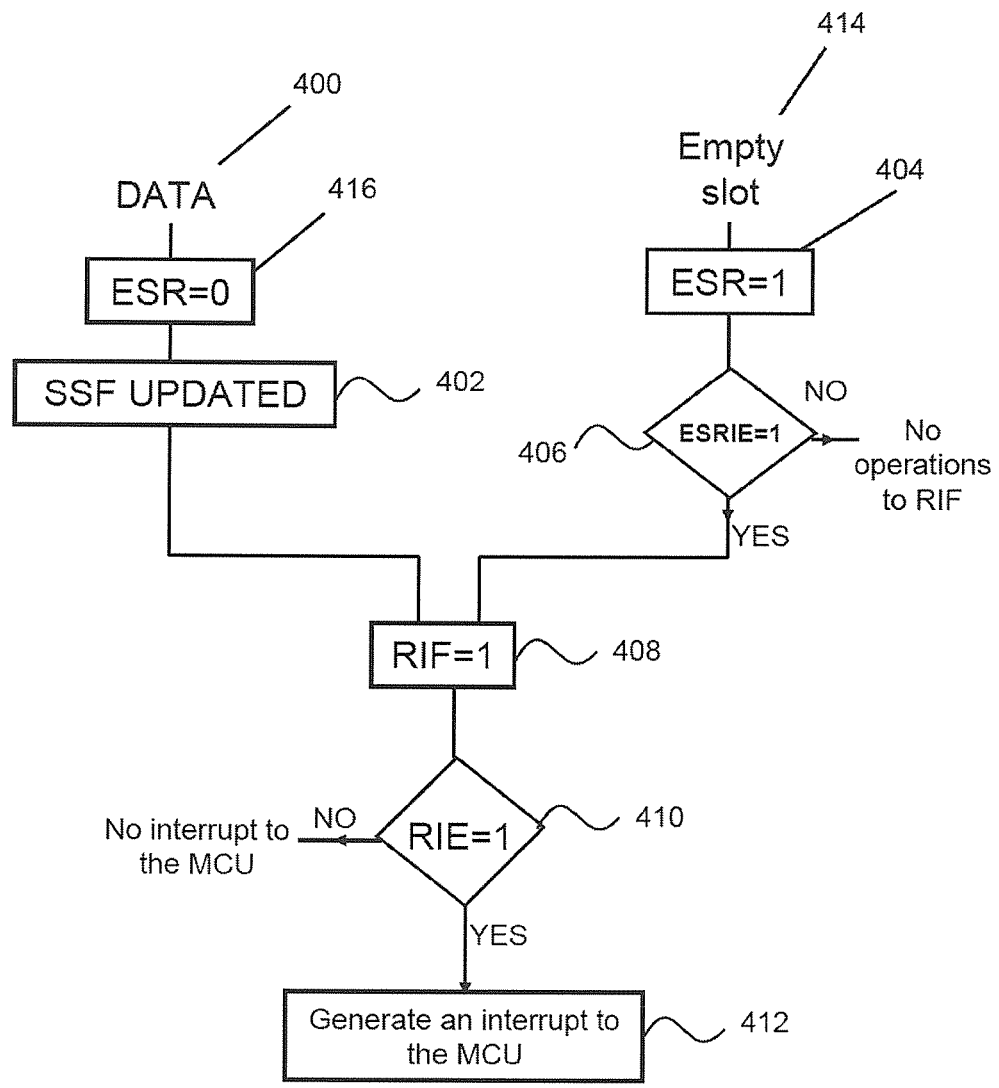
FIG. 4 is a flow diagram for showing the changes to the buffer and the statuses thereof for reception of data in a slot or an empty slot, in accordance with one embodiment of the present invention.

The basic steps relating to arrival of data in the relevant timeslot at the buffer can be described as follows and with reference to FIG. 4. After reception of a non-empty slot, i.e. data (400), SSF is updated (402) and ESR (416) is cleared (0). As the SSF is updated, the CC sets the RIF (408) to high (1) and if the receive interrupt enable (RIE) (410) is set to high (1), then an interrupt is sent to the MCU (412) by means of the interrupt line (322).

On the other hand, after reception of an empty slot (414), SSF is not updated (402) and ESR (404) is set high (1). If the ESRIE (406) is set to high (1) then the RIF (408) is set to high (1). Thus if the RIE (410) is set to high (1), then the CC generates an interrupt to the MCU (412). The value of the ESR register may then be read by the MCU to show that an event has occurred. Therefore if the MCU interrupt flag generation is required by application then the ESRIE bit must be set to high (1).

The above receive buffer layout has dedicated and flexible interrupt control for reception of empty slots. The MCU can disable interrupt flags by independently utilizing their enable control bits (RIE and/or ESRIE). Additional slot status information is provided by ESR flag. In this way it is possible to avoid host interrupt overload caused by empty slot reception. The previous status field data is preserved from being overwritten by useless status information after an empty slot reception and thus no status information is lost. In addition, this allows the MCU to save computational power for time-critical tasks, rather than redundant events.

The receive buffers are intended to be included in the communication controller (CC) of a FlexRay system; however there may be other environments where this type of buffer is equally relevant. For example, other time slot controlled buffer environments such as TDMA etc., other complex communication systems or any other environment which has a need for such types of buffers.

The invention claimed is:

1. A receive buffer, in a system node, of a type that receives information at regular time slots and indicates any status changes to a micro control unit (MCU), the receive buffer including comprising:
    a plurality of storage locations corresponding to a time slot, the plurality of storage locations include:
        a slot status field to store slot status information during a corresponding time slot;
        a receive interrupt field to store an interrupt indicator that indicates an interrupt flag is to be sent to the MCU via an interrupt line to indicate a change in slot status information stored at the slot status field;
        an empty slot reception interrupt enable bit to indicate whether the interrupt flag is sent if an empty slot is detected, wherein the MCU sets the empty slot reception interrupt enable bit to a first value to indicate that the interrupt flag is sent with reception of both data and the empty slot, and the MCU sets empty slot reception interrupt enable bit to a second value to indicate that the interrupt flag is not sent with reception of the empty slot; and
        an empty slot recognition field to be set to indicate that the empty slot is detected during the corresponding time slot, wherein the indicator is passed to the MCU via a control bus, instead of sending the interrupt flag via the interrupt line, in response to the empty slot recognition field being set and the empty slot reception interrupt enable bit being set to the second value, wherein the slot status information stored in the slot status field during a previous time slot is preserved in the slot status field corresponding to the empty slot after the detection of the empty slot during the corresponding time slot, and wherein the indicator is used to advise the MCU not to process any empty slots.

2. The receive buffer of claim 1, wherein the time slots are part of a Time Division Multiple access (TDMA) system process.

3. A communications controller for a system which samples one or more channels at regular time slots, the communications controller including one or more receive buffers of claim 2.

4. A control system in a vehicle for sending and receiving information between one or more nodes and one or more MCUs, wherein the system includes a communications controller of claim 2.

5. The receive buffer according to claim 1 for use in a FlexRay control system.

6. A communications controller for a system, the communications controller to sample one or more channels at regular time slots, the communications controller including one or more receive buffers of claim 1.

7. A control system in a vehicle for sending and receiving information between one or more nodes and one or more MCUs, wherein the system includes a communications controller of claim 6.

8. The control system of claim 7 in the form of a FlexRay control system.

9. The receive buffer of claim 1, wherein the slot status information is selected from the group consisting of no data/frame received, data/frame received with errors, and data/frame received without errors.

10. A method of operating a receive buffer of a type that receives information at regular time slots and indicates any status changes to a Micro control unit (MCU), the method comprising:
   storing slot status information, at a slot status field of a plurality of storage locations in a receive buffer, during a corresponding time slot;
   sending an interrupt flag, via an interrupt line, to the MCU to indicate a change in slot status information stored at the slot status field in response to an interrupt indicator being stored in a receive interrupt field;
   determining if an empty slot is detected during the corresponding time slot;
   determining whether an empty slot reception enable bit is set in response to the detection of the empty slot, wherein the MCU sets the empty slot reception enable bit to a first value to indicate that the interrupt flag is sent with reception of both data and the empty slot, and wherein the MCU sets empty slot reception interrupt enable bit to a second value to indicate that the interrupt flag is not sent with reception of the empty slot;
   setting an empty slot recognition field in response to determining that the empty slot is detected during the corresponding time slot;
   passing the indicator, via a control bus, to the MCU instead of the interrupt flag in response to the empty slot field being set during the corresponding time slot and the empty slot reception interrupt enable bit being set to the second value, wherein the indicator is used to advise the MCU not to process any empty slots; and
   preserving the slot status information stored in the slot status field corresponding to the empty slot during a previous time slot after the detection of the empty slot during the corresponding time slot.

11. The method of claim 10, wherein the step of storing a slot status field at the corresponding time slot for the receive buffer comprises using a Time Division Multiple access (TDMA) system process.

12. The method of claim 10, being carried out in a FlexRay control system.

13. The method of claim 12, wherein the step of storing the slot status information at the slot status field at the corresponding time slot for the receive buffer comprises using a Time Division Multiple access (TDMA) system process.

14. The method of claim 10, wherein the slot status information is selected from the group consisting of no data/frame received, data/frame received with errors, and data/frame received without errors.

15. A method of operating a receive buffer, the method comprising:
   receiving, at the receive buffer of a communication controller, signals at regular time slots;
   indicating any status changes of information in the signals to a Micro control unit (MCU);
   storing slot status information associated with a frame reception status, in a slot status field of a plurality of storage locations, during a corresponding time slot that a signal is received at the receive buffer;
   sending an interrupt flag, via an interrupt line, to the MCU to indicate a change in slot status information stored at the slot status field in response to an interrupt indicator being stored in a receive interrupt field;
   determining if an empty slot is detected during the corresponding time slot;
   determining whether an empty slot reception enable bit is set in response to the detection of the empty slot, wherein the MCU sets the empty slot reception enable bit to a first value to indicate that the interrupt flag is sent with reception of both data and the empty slot, and wherein the MCU sets empty slot reception interrupt enable bit to a second value to indicate that the interrupt flag is not sent with reception of the empty slot;
   setting an empty slot recognition field in response to the empty slot being detected;
   preserving previous slot status information stored in the slot status field during a previous time slot after the reception of the empty slot during the corresponding time slot;
   determining whether an empty slot reception interrupt bit is set; and
   passing an indicator for the empty slot being received to the MCU via a control bus instead of the interrupt flag in response to the empty slot reception status bit being set during the corresponding time slot and the empty slot reception interrupt enable bit being set to the second value, wherein the indicator is used to advise the MCU not to process any empty slots.

16. The method of claim 15, wherein the step of storing a slot status field at the corresponding time slot for the receive buffer comprises using a Time Division Multiple access (TDMA) system process.

17. The method of claim 15, being carried out in a FlexRay control system.

18. The method of any of claim 17, wherein the step of storing the slot status information at the slot status field at the corresponding time slot for the receive buffer comprises using a Time Division Multiple access (TDMA) system process.

19. The method of claim 15, further comprising:
   sampling, by a communications controller, one or more channels at regular time slots, wherein the communications controller includes the receive buffer.

20. The method of claim 15, wherein the slot status information is selected from the group consisting of no data/frame received, data/frame received with errors, and data/frame received without errors.

* * * * *